United States Patent
Seo

(10) Patent No.: US 9,215,404 B2
(45) Date of Patent: Dec. 15, 2015

(54) APPARATUS AND METHOD FOR RECEIVING TWO MODES OF BROADCASTS USING ONE TUNER IN SET-TOP-BOX

(75) Inventor: Dong-Uk Seo, Cheonan-si (KR)

(73) Assignee: Samsung Electronics Co., Ltd (KR)

( * ) Notice: Subject to any disclaimer, the term of this patent is extended or adjusted under 35 U.S.C. 154(b) by 1125 days.

(21) Appl. No.: 12/581,481

(22) Filed: Oct. 19, 2009

(65) Prior Publication Data

US 2010/0097528 A1    Apr. 22, 2010

(30) Foreign Application Priority Data

Oct. 17, 2008  (KR) .................... 10-2008-0101930

(51) Int. Cl.
| | |
|---|---|
| H04N 7/173 | (2011.01) |
| H04N 7/10 | (2006.01) |
| H04L 12/28 | (2006.01) |
| H04N 21/426 | (2011.01) |
| H04N 21/438 | (2011.01) |
| H04H 40/18 | (2008.01) |

(52) U.S. Cl.
CPC ............ *H04N 7/106* (2013.01); *H04L 12/2801* (2013.01); *H04L 12/2898* (2013.01); *H04N 21/4263* (2013.01); *H04N 21/4383* (2013.01); *H04H 40/18* (2013.01)

(58) Field of Classification Search
None
See application file for complete search history.

(56) References Cited

U.S. PATENT DOCUMENTS

| | | | | | |
|---|---|---|---|---|---|
| 5,396,642 | A * | 3/1995 | Blais et al. | ...................... | 725/131 |
| 6,721,018 | B1 * | 4/2004 | Shintani et al. | ............... | 348/731 |
| 6,725,463 | B1 * | 4/2004 | Birleson | ........................ | 725/151 |
| 7,304,689 | B2 * | 12/2007 | Englmeier | ..................... | 348/731 |
| 2007/0124790 | A1 * | 5/2007 | Hwang et al. | .................. | 725/131 |

FOREIGN PATENT DOCUMENTS

| | | |
|---|---|---|
| KR | 1019990019344 | 3/1999 |
| KR | 1020070056584 | 6/2007 |

* cited by examiner

*Primary Examiner* — Fernando Alcon
(74) *Attorney, Agent, or Firm* — The Farrell Law Firm, P.C.

(57) ABSTRACT

An apparatus and a method for receiving two broadcast modes using one tuner in a Set-Top-Box (STB) are provided. The integrated tuner unit receives a broadcast signal of at least one of a DSG scheme and an OOB scheme to tune a desired broadcast band, and converts the broadcast signal into at least one Intermediate Frequency (IF) signal. The switching unit switches the at least one IF signal to at least one of the DSG demodulator and the OOB demodulator. The DSG demodulator demodulates the at least one IF signal according to the DSG scheme, when the broadcast signal of the DSG scheme is received. The OOB demodulator demodulates the at least one IF signal according to the OOB scheme, when the broadcast signal of the OOB scheme is received.

16 Claims, 5 Drawing Sheets

APPARATUS AND METHOD FOR RECEIVING TWO MODES OF BROADCASTS USING ONE TUNER IN SET-TOP-BOX

PRIORITY

This application claims priority under 35 U.S.C. §119(a) to a Korean Patent Application filed in the Korean Intellectual Property Office on Oct. 17, 2008 and assigned Serial No. 10-2008-0101930, the content of which is incorporated herein by reference.

BACKGROUND OF THE INVENTION

1. Field of the Invention

The present invention relates generally to a set-top-box based on an open cable.

More particularly, the present invention relates to an apparatus and a method for receiving broadcasts of an Out-Of-Band (OOB) channel and a Data Over Cable Service Interface Specification (DOCSIS) Set-top Gateway (DSG) channel using one tuner in a set-top-box.

2. Description of the Related Art

Digitalization of a broadcasting mediums including, for example, satellite broadcasting, sky waves, and cable broadcasting, are rapidly developing all over the world. This has caused a rapid growth in digital Set-Top-Boxes (STBs) that act as a medium for coupling the Internet with TeleVision (TV) and digital broadcasting.

A broadcasting program currently used for cable broadcasting uses various formats for encoding and modulation. Accordingly, manufacturers of STBs and broadcasting program providers have developed standards for broadcasting programs. For example, an open cable scheme has been proposed as a common standard for a digital broadcasting program. Channels for full duplex data communication that are supported by the open cable STB include, for example, a DSG channel and an OOB channel. Here, DSG channels are primarily used in Korea, and OOB channels are primarily used in the United States. Some service providers mount separate tuners in order to support both DSG channels and OOB channels.

FIG. 1 is a schematic block diagram illustrating the conventional STB. As illustrated in FIG. 1, the conventional STB includes a DSG tuner 100, an OOB tuner 102, a Quadrature Amplitude Modulation (QAM) demodulation Integrated Circuit (IC) 104, a Quadrature Phase Shift Keying (QPSK) demodulation IC 106, an output unit 108, a controller 110, and a memory 112.

A broadcast signal received via an antenna is divided and simultaneously input to the DSG tuner 100 and the OOB tuner 102.

The DSG tuner 100 selects a channel desired by a user according to a DSG scheme from broadcast signals received via the antenna under control of the controller 110. The QAM demodulation IC 104 demodulates a signal of the channel selected by the DSG tuner 100 to output an original data signal, and original video and/or audio signals. Additionally, the QAM demodulation IC 104 decodes signals separated by a data decoder, a video decoder, and an audio decoder, and transfers the decoded signals to the output unit 108 for display to the user.

Simultaneously, the OOB tuner 102 selects a channel desired by the user according to an OOB scheme from broadcast signals received via the antenna under control of the controller 110. The QPSK demodulation IC 106 demodulates a signal of the channel selected by the OOB tuner 102 to output an original data signal, and original video and/or audio signals. Additionally, the QPSK demodulation IC 106 decodes signals separated by a data decoder, a video decoder, and an audio decoder, and transfers the decoded signals to the output unit 108 for display to the user.

The DSG tuner 100 and the OOB tuner 102 perform tuning operations in accordance with the reception of a received DSG signal and a received OOB signal, respectively.

As described above, due to tuner characteristics, a single tuner may only tune a single broadcast frequency. A broadcast receiver is manufactured using two tuners by mounting both an OOB tuner for an OOB channel and a DSG tuner for a DSG channel according to a digital broadcast standard.

Since services are not provided simultaneously in the two channels, one of the OOB channel and the DSG channel is selected and used depending on a service provider. Therefore, it is a waste of resources to mount two tuners on one STB. In addition, since the STB is constructed with both the tuner for the DSG channel and the tuner for the OOB channel, a space inside the receiver is complicated and manufacturing costs and power consumption increase.

SUMMARY OF THE INVENTION

The present invention has been made to address at least the above problems and/or disadvantages and to provide at least the advantages described below. Accordingly, an aspect of the present invention provides an apparatus and a method for receiving two modes of broadcasts using one tuner in an STB.

Another aspect of the present invention provides an apparatus and a method for reducing power consumption and reducing a size of a Printed Circuit Board (PCB) by using one tuner in an STB.

According to one aspect of the present invention, an apparatus for receiving two broadcast modes using one tuner in a Set-Top-Box (STB) is provided. The apparatus includes an integrated tuner unit for receiving a broadcast signal of at least one of a Data Over Cable Service Interface Specification (DOCSIS) Set-top Gateway (DSG) scheme and an Out-Of-Band (OOB) scheme to tune a desired broadcast band, and converting the broadcast signal into at least one Intermediate Frequency (IF) signal. The apparatus also includes a switching unit for switching the at least one IF signal to at least one of a DSG demodulator and an OOB demodulator. The apparatus further includes the DSG demodulator for demodulating the IF signal according to the DSG scheme when the broadcast signal of the DSG scheme is received. The apparatus includes the COB demodulator for demodulating the IF signal according to the OOB scheme when the broadcast signal of the OOB scheme is received.

According to another aspect of the present invention, a method for receiving two broadcast modes using one tuner in a Set-Top-Box (STB) is provided. A broadcast signal of at least one of a Data Over Cable Service Interface Specification (DOCSIS) Set-top Gateway (DSG) scheme and an Out-Of-Band (OOB) scheme is received to tune a desired broadcast band. The tuned broadcast signal is converted into at least one Intermediate Frequency (IF) signal. The at least one IF signal is switched to at least one of a DSG demodulator and an OOB demodulator. The at least one IF signal is demodulated according to the DSG scheme, when the broadcast signal of the DSG scheme is received. the at least one IF signal is demodulated according to the OOB scheme, when the broadcast signal of the OOB scheme is received.

BRIEF DESCRIPTION OF THE DRAWINGS

The above and other aspects, features and advantages of the present invention will be more apparent from the following detailed description when taken in conjunction with the accompanying drawings in which.

DETAILED DESCRIPTION OF EMBODIMENTS OF THE PRESENT INVENTION

Figure 1:
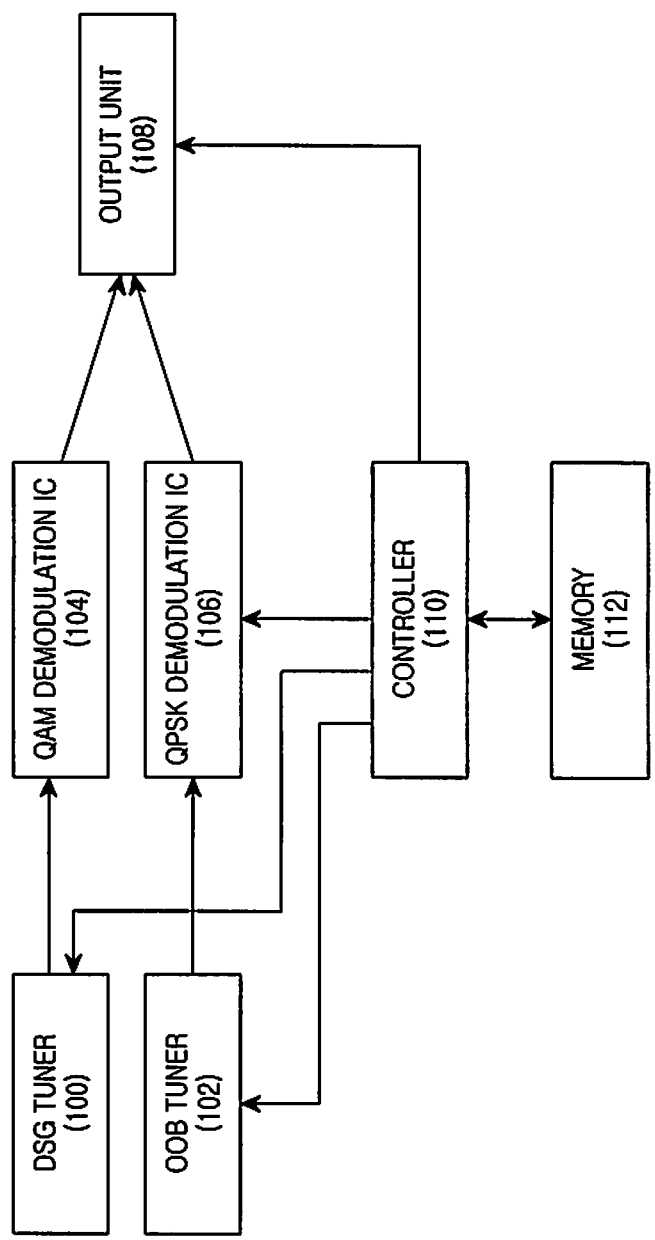
FIG. 1 is a schematic block diagram illustrating a conventional STB.

Embodiments of the present invention are described in detail with reference to the accompanying drawings. The same or similar components may be designated by the same or similar reference numerals although they are illustrated in different drawings. Detailed descriptions of constructions or processes known in the art may be omitted to mold obscuring the subject matter of the present invention. Terms described below, which are defined considering functions in the present invention, can be different depending on user and operator's intention or practice. Therefore, the terms should be defined on the basis of the disclosure throughout this specification.

Embodiments of the present invention provide an apparatus and a method for receiving two broadcast modes using one tuner in an STB.

Figure 2:
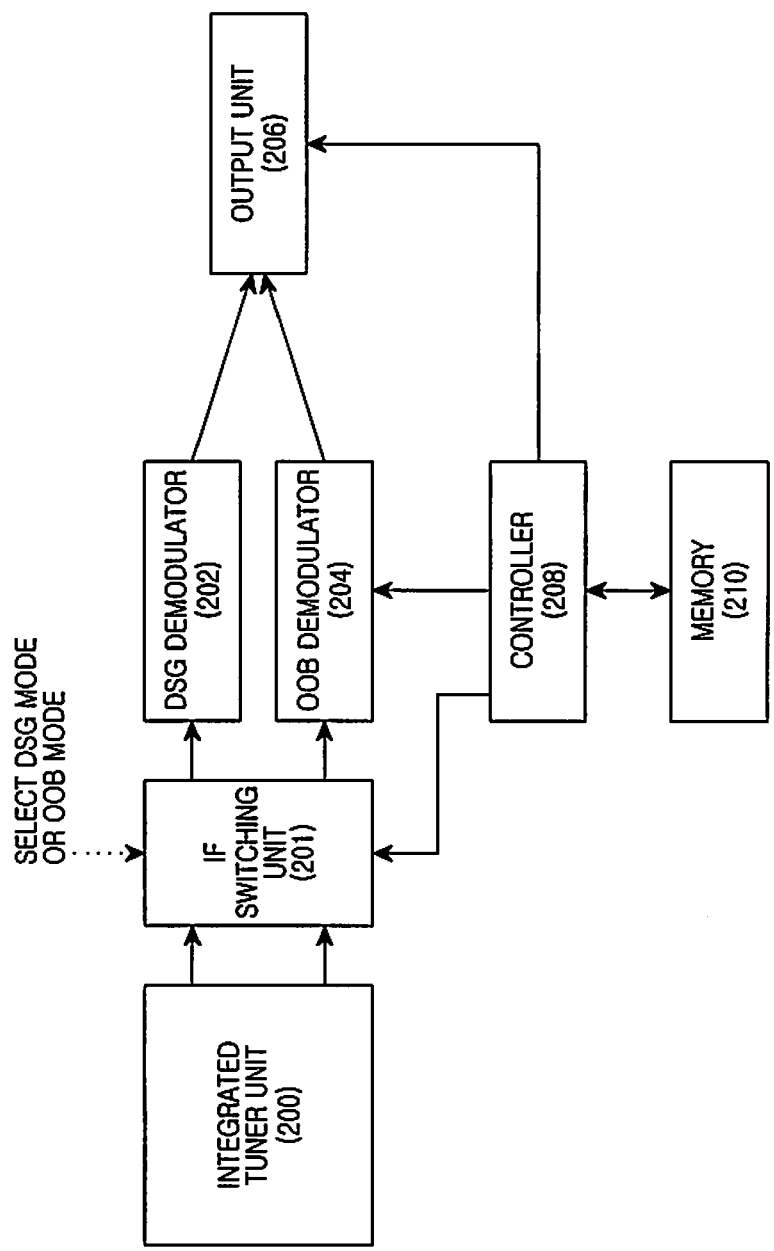
FIG. 2 is a block diagram illustrating an apparatus for receiving two broadcast modes using one tuner in an STB, according to an embodiment of the present invention.

FIG. 2 is a block diagram illustrating an apparatus for receiving two broadcast modes using one tuner in an STB, according to an embodiment of the present invention.

Referring to FIG. 2, the STB includes an integrated tuner unit 200, an IF switching unit 201, a DSG demodulator 202, an OOB demodulator 204, an output unit 206, a controller 208, and a memory 210.

The integrated tuner unit 200 receives broadcast signals via an antenna or a coaxial cable, selects a desired broadcast signal, converts the desired broadcast signal into an IF signal, and outputs the IF signal to the IF switching unit 201.

The IF switching unit 201 switches an IF signal of the integrated tuner unit 200, and outputs the IF signal to the DSG demodulator 202 and/or the OOB demodulator 204 under control of the controller 208. In an embodiment of the present invention, the IF switching unit 201 includes a coil and condensers (as described with respect to FIG. 3), and simultaneously transmits an IF signal from the integrated tuner unit 200 to the DSG demodulator 202 and the OOB demodulator 204. In an embodiment of the present invention further described in FIG. 4, the IF switching unit 201 selectively outputs an IF signal to the DSG demodulator 202 or the OOB demodulator 204 depending on a selected mode using a switch chipset.

The DSG demodulator 202 demodulates an IF signal from the IF switching unit 201 according to a DSG mode. Specifically, the DSG demodulator 202 uses a 64QAM or 256QAM digital frequency modulation technique with respect to a signal in a bandwidth of about 6 MHz.

The OOB demodulator 204 demodulates an IF signal from the IF switching unit 201 according to an OOB mode. Specifically, the OOB demodulator 204 uses a QPSK digital frequency modulation technique with respect to a signal in a bandwidth of about 1 MHz or 2 MHz.

The demodulators 202 and 204 demodulate a signal of a channel selected by the integrated tuner unit 200 to output an original data signal, and original video and/or audio signals. Additionally, the demodulators 202 and 204 decode signals separated by a data decoder, a video decoder, and an audio decoder, and transfer the decoded signals to the output unit 206 for display to a user.

The output unit 206 displays and outputs video, audio, and data streams on a bit basis demodulated by the DSG demodulator 202 or the OOB demodulator 204.

The controller 208 controls overall operations of the STB. For example, the controller 208 initializes various set-top hardware devices or processes Internet-related businesses and interactive TV applications, and monitors and manages a hardware interrupt. Additionally, the controller retrieves data or a command from the memory 210 for processing. According to an embodiment of the present invention, the controller 208 determines whether the DSG demodulator 202 or the OOB demodulator 204 is used, and outputs a relevant mode control signal to the IF switching unit 201.

The memory 210 is used for storing and manipulating user commands. For example, the memory 210 is used for processing a graphic engine or a video decoder, and descrambling data.

Figure 3:
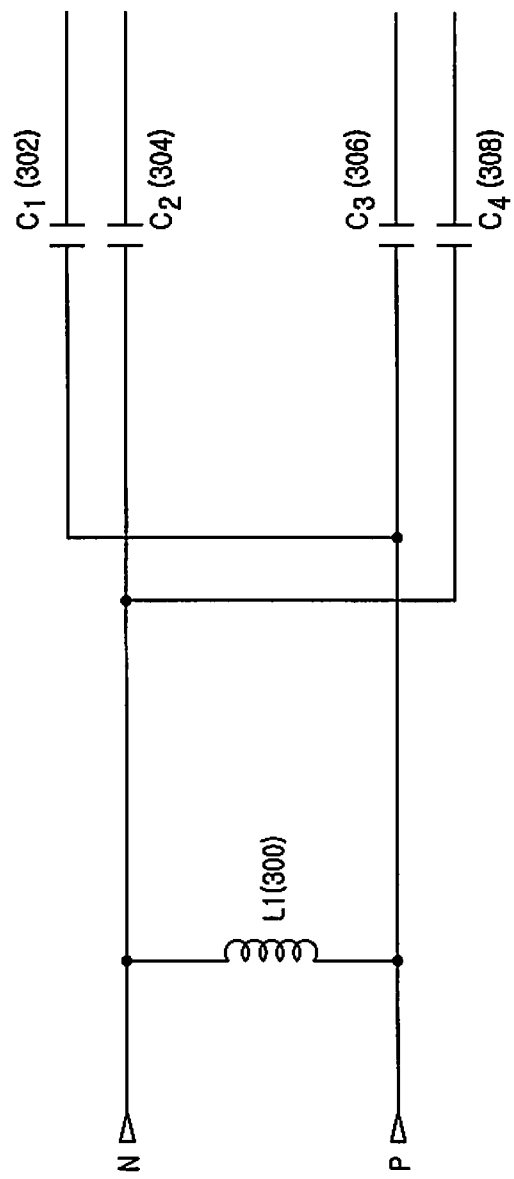
FIG. 3 is a diagram illustrating an IF switching unit of an STB according to an embodiment of the present invention.

FIG. 3 is a diagram illustrating an IF switching unit of an STB, according to an embodiment of the present invention.

Referring to FIG. 3, the IF switching unit 201 outputs an IF signal for OOB demodulation and DSG demodulation from the integrated tuner unit 200 entering from the left, to the DSG demodulator 202 and the OOB demodulator 204, simultaneously. Specifically, with input ends N and P connected with a coil L1 300, the IF switching unit 201 outputs an IF signal to the DSG demodulator 202 via condensers $C_1$ 302 and $C_2$ 304, and simultaneously, outputs the IF signal to the OOB demodulator 204 via condensers $C_3$ 306 and $C_4$ 308. Since the same IF signals are simultaneously output to the DSG demodulator 202 and the OOB demodulator 204, an impedance characteristic is reinforced using the coil L1 300 for signal strength. The coil L1 300 is selected and used for suitability with an input impedance characteristic of demodulation.

Figure 4:
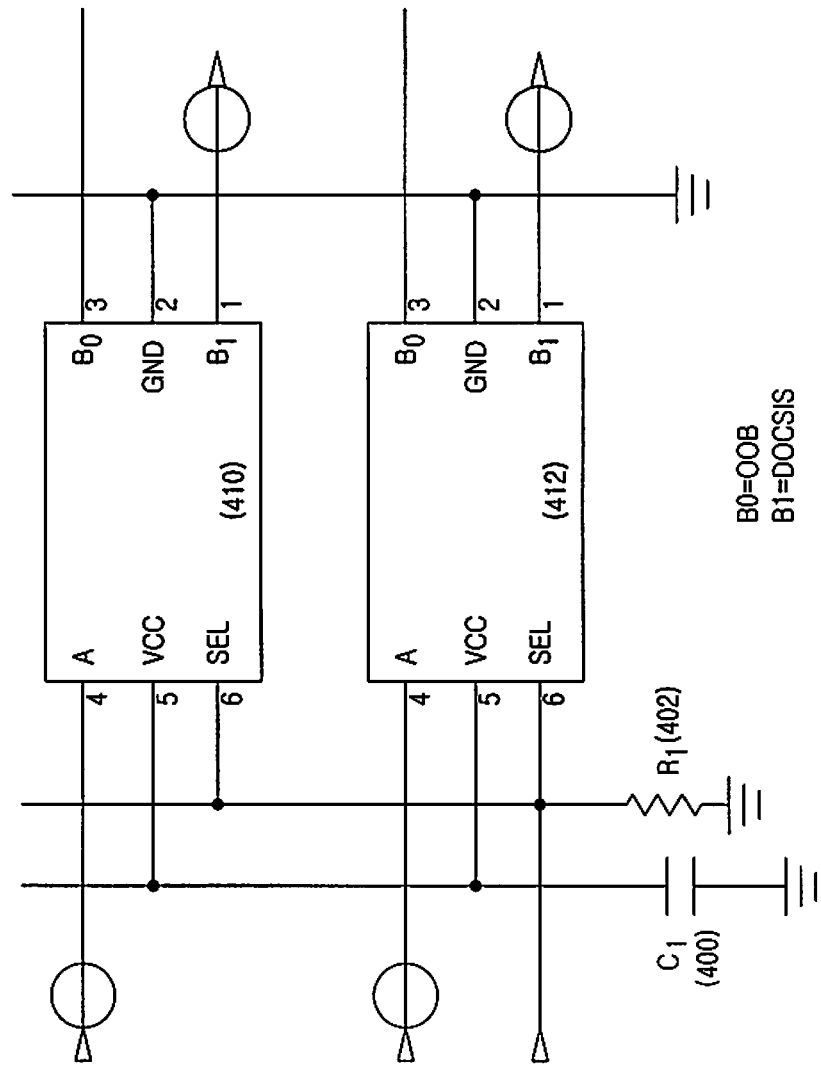
FIG. 4 is a view illustrating in detail an IF switching unit of an STB, according to an embodiment of the present invention.

FIG. 4 is a diagram illustrating an IF switching unit of an STB, according to an embodiment of the present invention.

Referring to FIG. 4, switch chipsets 410 and 412 are used in order to supply a clear IF signal for OOB demodulation or DSG demodulation.

The switch chipsets 410 and 412 include an A pin, a GND pin for grounding, a Vcc pin for supplying power, and input/output pins of the A pin, including a $B_0$ pin, a $B_1$ pin, and a SEL pin. The switch chipset may select whether to output an IF signal to the OOB demodulator 204 or whether to output an IF signal to the DSG demodulator 202 using the SEL pin. Since the SEL pin is connected with the controller 208 of FIG. 2, the SEL is selected in response to a control signal of the controller 208. Differential IF signals output from the integrated tuner unit 200 are supplied to the switch chipsets 410 and 412 to output an IF signal to the $B_0$ pin or the $B_1$ pin depending on each mode.

$C_1$ 400 is a condenser for removing a noise of power supplied to the switch chipsets 410 and 412. $R_1$ 402 is a pull-down resistor that influences a state of the SEL pin so that switching is selected to the $B_0$ pin when the STB initially boots. In the conventional design, $R_1$ 402 is mounted as a pull-up resistor in order to use the $B_1$ pin as a basis. The circuit is capable of operating normally without a pull-down resistor and a pull-up resistor.

Figure 5:
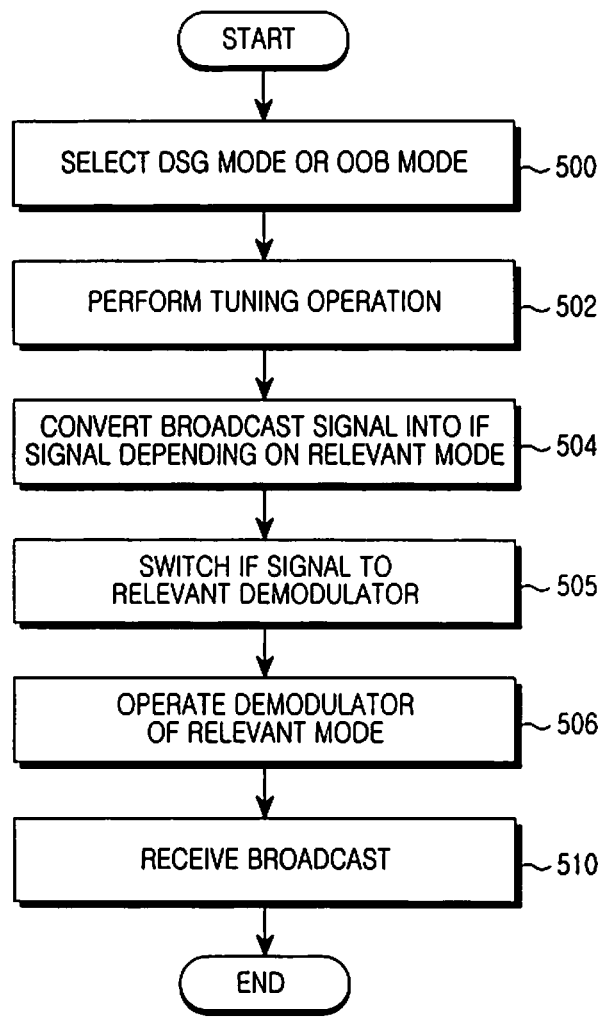
FIG. 5 is a flowchart illustrating a method for receiving two broadcast modes using one tuner in an STB, according to an embodiment of the present invention.

FIG. 5 is a flowchart illustrating a method for receiving two broadcast modes using one tuner in an STB, according to an embodiment of the present invention.

Referring to FIG. 5, the controller 208 determines whether to operate in a DSG mode or an OOB mode between a broadcast system and a broadcast receiver, and selects a relevant mode according to an open cable standard in step 500. Whether to operate in the DSG mode or the OOB mode is determined depending on a service provider. In an embodiment of the present invention, while a received broadcast signal is demodulated at the DSG demodulator 202 and the OOB demodulator 204, the controller 208 may determine whether a channel is a DSG channel or an OOB channel using the demodulated broadcast signal.

The integrated tuner unit 200 tunes a received broadcast signal in the DSG mode or the OOB mode under control of the controller 208 in step 502, and converts the tuned broadcast signal into an IF signal so that the DSG demodulator 202 or the OOB demodulator 204 may demodulate the broadcast signal in step 504.

The IF switching unit 201 switches an IF signal from the integrated tuner unit 200 to a relevant demodulator depending on a relevant mode in step 505. For example, in an embodiment of the present invention described in FIG. 3, the IF switching unit 201 includes a coil and condensers, and simultaneously outputs an IF signal from the integrated tuner unit 200 to the DSG demodulator 202 and the OOB demodulator 204. In an embodiment of the present invention described in FIG. 4, the IF switching unit outputs an IF signal to the DSG demodulator 202 or the OOB demodulator 204 using the switch chipsets 410 and 412 depending on a selected mode. In the conventional art, each tuner transfers a broadcast signal (IF signal) to each demodulator.

The demodulators 202 and 204 perform demodulation according to respective demodulation schemes depending on a mode in step 506. Specifically, the demodulators 202 and 204 demodulate a signal of a channel selected by the integrated tuner unit 200 to output an original data signal, output original video and/or audio signals, and perform a decoding operation. A demodulator of a mode not in use is switched to a sleep mode, so that power consumption may be reduced.

The output unit 206 displays a demodulated digital signal so that a user may receive broadcasting in step 510. Additionally, the demodulated digital signal is processed by the controller 208 and the memory 210, so that a broadcast receiver function is performed.

As described above, complexity inside a broadcast receiver, manufacturing costs, power consumption, and electromagnetic wave noises may be reduced by converting a broadcast signal into an IF signal using one tuner, and switching the IF signal to a relevant demodulator.

While the invention has been shown and described with reference to certain embodiments thereof, it will be understood by those skilled in the art that various changes in form and details may be made therein without departing from the spirit and scope of the invention as defined by the appended claims.

What is claimed is:

1. An apparatus for receiving two broadcast modes using one tuner in a Set-Top-Box (STB), the apparatus comprising:
   an integrated tuner unit capable of receiving broadcast signals of both a Data Over Cable Service Interface Specification (DOCSIS) Set-top Gateway (DSG) scheme and an Out-Of-Band (OOB) scheme to tune a desired broadcast band, and converting a received broadcast signal into an Intermediate Frequency (IF) signal;
   a switching unit for switching the IF signal to at least one of a DSG demodulator and an OOB demodulator;
   the DSG demodulator for demodulating the IF signal according to the DSG scheme when the received broadcast signal is of the DSG scheme; and
   the OOB demodulator for demodulating the at least one IF signal according to the OOB scheme when the received broadcast signal is of the OOB scheme,
   wherein the switching unit connects between the integrated tuner unit and the DSG demodulator while the OOB demodulator is in a sleep mode, when the received broadcast signal is of the DSG scheme, and the switching unit connects between the integrated turner unit and the OOB demodulator while the DSG demodulator is in a sleep mode, when the received broadcast signal is of the OOB scheme.

2. The apparatus of claim 1, wherein the switching unit comprises a coil and a condenser and simultaneously provides the IF signal from the integrated tuner unit to both the DSG demodulator and the OOB demodulator.

3. The apparatus of claim 1, wherein the switching unit provides the IF signal to one of the DSG demodulator and the OOB demodulator using a switch chipset depending on a selected mode.

4. The apparatus of claim 1, further comprising an output unit for displaying the demodulated broadcast signal.

5. The apparatus of claim 1, further comprising a controller for blocking power supplied to the OOB demodulator to switch the OOB demodulator to a sleep mode when the received broadcast signal is of the DSG scheme, and blocking power supplied to the DSG demodulator to switch the DSG demodulator to a sleep mode when the received broadcast signal is of the OOB scheme.

6. A method for receiving two broadcast modes using one tuner in a Set-Top-Box (STB), the method comprising the steps of:
   receiving, at an integrated tuner unit, a broadcast signal of at least one of a Data Over Cable Service Interface Specification (DOCSIS) Set-top Gateway (DSG) scheme and an Out-Of-Band (OOB) scheme to tune a desired broadcast band, and converting the received broadcast signal into an Intermediate Frequency (IF) signal, wherein the integrated tuner unit is capable of receiving broadcast signals of the DSG scheme and the OOB scheme;
   switching, by a switching unit, the IF signal to at least one of a DSG demodulator and an OOB demodulator;
   demodulating the IF signal according to the DSG scheme, when the received broadcast signal is of the DSG scheme; and
   demodulating the IF signal according to the OOB scheme, when the received broadcast signal is of the OOB scheme,
   wherein the switching unit connects between the integrated tuner unit and the DSG demodulator while the OOB demodulator is in a sleep mode, when the received broadcast signal is of the DSG scheme, and the switching unit connects between the integrated tuner unit and the OOB demodulator while the DSG demodulator is in a sleep mode, when the received broadcast signal is of the OOB scheme.

7. The method of claim 6, wherein the switching of the IF signal comprises simultaneously providing the IF signal to the DSG demodulator and the OOB demodulator.

8. The method of claim 6, wherein the switching of the IF signal comprises providing the IF signal to one of the DSG demodulator and the OOB demodulator using a switch chipset depending on a selected mode.

9. The method of claim 6, further comprising displaying the demodulated broadcast signal.

10. The method of claim 6, further comprising:
blocking power supplied to the OOB demodulator to switch the OOB demodulator to a sleep mode, when the received broadcast signal is of the DSG scheme; and
blocking power supplied to the DSG demodulator to switch the DSG demodulator to a sleep mode, when the received broadcast signal is of the OOB scheme.

11. A Set-Top-Box apparatus for receiving broadcast signals of both a Data Over Cable Service Interface Specification (DOCSIS) Set-top Gateway (DSG) scheme and an Out-Of-Band (OOB) scheme broadcast modes using one tuner, the apparatus comprising:
a tuner unit capable of converting a received broadcast signal into an Intermediate Frequency (IF) signal;
a DSG demodulator for demodulating the IF signal according to the DSG scheme when the received broadcast signal is of the DSG scheme;
an OOB demodulator for demodulating the IF signal according to the OOB scheme when the received broadcast signal is of the OOB scheme;
a switching unit for switching the IF signal to at least one of the DSG demodulator and the OOB demodulator; and
a controller configured to control the switching unit to connect between the tuner unit and the DSG demodulator while the OOB demodulator is in a sleep mode, when the received broadcast signal is of the DSG scheme, and to control the switching unit to connect between the tuner unit and the OOB demodulator while the DSG demodulator is in a sleep mode, when the received broadcast signal is of the OOB scheme.

12. The apparatus of claim 11, wherein the switching unit provides the IF signal to one of the DSG demodulator and the OOB demodulator using a switch chipset depending on a selected mode.

13. The apparatus of claim 11, further comprising an output unit configured to display a demodulated broadcast signal.

14. The apparatus of claim 11, wherein the controller is further configured to block power supplied to the OOB demodulator to switch the OOB demodulator to the sleep mode, when the received broadcast signal is of the DSG scheme, and to block power supplied to the DSG demodulator to switch the DSG demodulator to the sleep mode, when the received broadcast signal is of the OOB scheme.

15. A method of a receiving apparatus for receiving broadcast signals of both a Data Over Cable Service Interface Specification (DOCSIS) Set-top Gateway (DSG) scheme and an Out-Of-Band (OOB) scheme broadcast modes using one tuner in a Set-Top-Box (STB), the method comprising the steps of:
converting, by a tuner unit, a received broadcast signal into an Intermediate Frequency (IF) signal,
switching, by a switching unit, the IF signal to at least one of a DSG demodulator and an OOB demodulator, the switching unit being connected between the tuner unit and the DSG and OOB demodulators;
when the received broadcast signal is of the DSG scheme, transmitting the IF signal to the DSG demodulator via the switching unit while the OOB demodulator is in a sleep mode, and demodulating the IF signal according to the DSG scheme at the DSG demodulator; and
when the received broadcast signal is of the OOB scheme, transmitting the IF signal to the OOB demodulator via the switching unit while the DSG demodulator is in a sleep mode, and demodulating the IF signal according to the OOB scheme at the OOB demodulator.

16. The method of claim 15, further comprising:
blocking power supplied to the OOB demodulator to switch the OOB demodulator to the sleep mode, when the received broadcast signal is of the DSG scheme; and
blocking power supplied to the DSG demodulator to switch the DSG demodulator to the sleep mode, when the received broadcast signal is of the OOB scheme.

\* \* \* \* \*